US009213482B2

(12) United States Patent
Mai et al.

(10) Patent No.: US 9,213,482 B2
(45) Date of Patent: Dec. 15, 2015

(54) TOUCH CONTROL DEVICE AND METHOD

(75) Inventors: Wei-Kuo Mai, Hsinchu (TW); Shih-Peng Huang, Hsinchu County (TW); Chung-Jung Liou, Taichung (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 250 days.

(21) Appl. No.: 13/542,592

(22) Filed: Jul. 5, 2012

(65) Prior Publication Data
US 2013/0120286 A1 May 16, 2013

Related U.S. Application Data

(60) Provisional application No. 61/558,457, filed on Nov. 11, 2011.

(30) Foreign Application Priority Data

Jan. 20, 2012 (TW) .............................. 101102526 A

(51) Int. Cl.
G06F 3/041 (2006.01)
G06F 3/0488 (2013.01)

(52) U.S. Cl.
CPC .. G06F 3/04883 (2013.01); *G06F 2203/04808* (2013.01)

(58) Field of Classification Search
CPC .................. G06F 3/04883; G06F 2203/04808
USPC ............. 345/156–184; 701/22; 715/856, 768; 455/566; 382/187
See application file for complete search history.

(56) References Cited

U.S. PATENT DOCUMENTS

| | | | | |
|---|---|---|---|---|
| 6,333,753 B1 * | 12/2001 | Hinckley | ....................... | 715/768 |
| 7,154,483 B2 * | 12/2006 | Kobayashi | .................... | 345/173 |
| 7,880,730 B2 * | 2/2011 | Robinson et al. | ............. | 345/173 |
| 8,169,404 B1 * | 5/2012 | Boillot | ............................ | 345/158 |
| 8,314,773 B2 * | 11/2012 | Low et al. | ..................... | 345/166 |
| 8,483,770 B2 * | 7/2013 | Yoo et al. | ...................... | 455/566 |
| 8,711,115 B2 * | 4/2014 | Ozawa et al. | .................. | 345/173 |
| 2002/0097910 A1 * | 7/2002 | Guha | ............................ | 382/187 |
| 2002/0171686 A1 * | 11/2002 | Kamen et al. | .................. | 345/850 |
| 2005/0028112 A1 * | 2/2005 | Iijima | ........................... | 715/856 |
| 2006/0267857 A1 * | 11/2006 | Zhang et al. | .................. | 345/1.1 |
| 2008/0041640 A1 * | 2/2008 | Gillespie et al. | ............ | 178/18.01 |
| 2008/0068350 A1 | 3/2008 | Rosenberg et al. | | |
| 2008/0106523 A1 * | 5/2008 | Conrad | ......................... | 345/173 |
| 2009/0150802 A1 * | 6/2009 | Do et al. | ........................ | 715/757 |
| 2009/0262073 A1 * | 10/2009 | Rigazio et al. | ................ | 345/158 |
| 2009/0262086 A1 * | 10/2009 | Chen | .............................. | 345/173 |
| 2010/0039404 A1 * | 2/2010 | Lin et al. | ........................ | 345/174 |
| 2010/0094496 A1 * | 4/2010 | Hershkovitz et al. | ........... | 701/22 |
| 2010/0234077 A1 * | 9/2010 | Yoo et al. | ...................... | 455/566 |
| 2010/0251152 A1 * | 9/2010 | Cho et al. | ....................... | 715/765 |

(Continued)

OTHER PUBLICATIONS

U.S. Appl. No. 61/558,475.*

*Primary Examiner* — Prabodh M Dharia
(74) *Attorney, Agent, or Firm* — patenttm.us

(57) ABSTRACT

A method for controlling a touch control device includes defining a first area and a second area on a touchpad, detecting whether a touched position on the touchpad that is touched by an operating object falls in the first area or the second area, and calculating the corresponding on-screen coordinates of the operating object with different sets of ratios depending on the touched position.

24 Claims, 14 Drawing Sheets

(56) References Cited

U.S. PATENT DOCUMENTS

| | | | |
|---|---|---|---|
| 2011/0009813 A1* | 1/2011 | Rankers | 604/66 |
| 2011/0022990 A1* | 1/2011 | Wu et al. | 715/856 |
| 2011/0032191 A1 | 2/2011 | Cooke et al. | |
| 2011/0043515 A1* | 2/2011 | Stathis | 345/419 |
| 2011/0072463 A1* | 3/2011 | Zaslavsky et al. | 725/41 |
| 2011/0107270 A1* | 5/2011 | Wang et al. | 715/850 |
| 2011/0181534 A1* | 7/2011 | Palacios | 345/173 |
| 2011/0210939 A1* | 9/2011 | Reynolds et al. | 345/174 |
| 2011/0285636 A1* | 11/2011 | Howard et al. | 345/173 |
| 2012/0007823 A1* | 1/2012 | Ozawa et al. | 345/173 |
| 2012/0256835 A1* | 10/2012 | Musick et al. | 345/161 |
| 2012/0319986 A1* | 12/2012 | Vymenets | 345/173 |
| 2012/0320198 A1* | 12/2012 | Yasutake | 348/143 |
| 2013/0117715 A1* | 5/2013 | Williams et al. | 715/835 |
| 2013/0127738 A1* | 5/2013 | Miller et al. | 345/173 |
| 2013/0167077 A1* | 6/2013 | Nishihashi | 715/800 |
| 2013/0321288 A1* | 12/2013 | Adamson et al. | 345/173 |
| 2014/0074426 A1* | 3/2014 | Hotelling et al. | 702/150 |

* cited by examiner

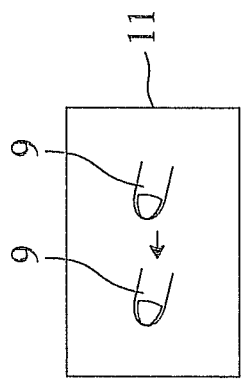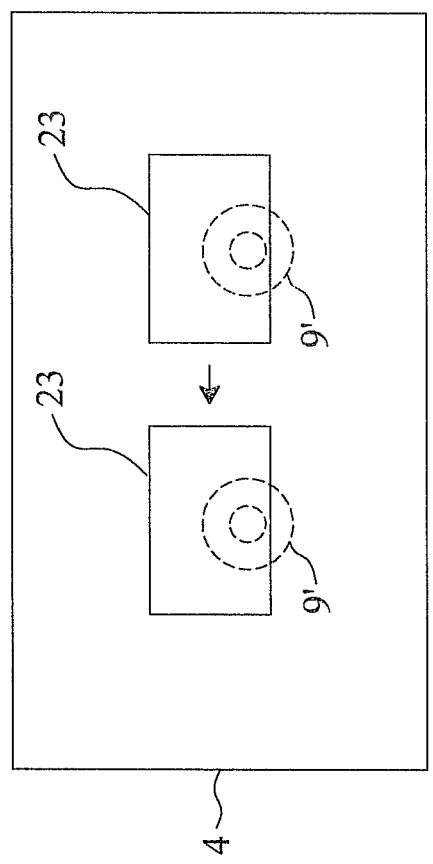
Fig. 13

TOUCH CONTROL DEVICE AND METHOD

CROSS REFERENCE TO RELATED APPLICATIONS

This application claims priority of U.S. Provisional Application No. 61/558,457 filed on Nov. 11, 2011, under 35 U.S.C. §119(e).

FIELD OF THE INVENTION

The present invention is related generally to a touch control device and, more particularly, to a touch control device and a control method thereof so that, when a touchpad is touched by an operating object, the corresponding coordinates of the operating object on a screen can be obtained by calculating with different sets of ratios depending on the touched position on the touchpad.

BACKGROUND OF THE INVENTION

With the continuous improvement of touch control technology, touch control operation is applicable not only to the small touch screens of the conventional touch-screen mobile devices such as mobile phones and satellite-based navigation devices, but also to operating systems that provide multi-touch functions, such as Microsoft's Windows 7 and Windows 8 and Apple Inc.'s iPhone OS. Thus, the touch control operation environment has extended from portable devices to desktop devices, allowing users to perform various operations directly on large touch screens.

Nowadays, the development of operating systems supporting touch control operation has gradually matured, and yet large touch screens are disadvantaged by high costs and by the limitation that users must be within a very short distance from the screens in order to exercise touch control. Therefore, touch control devices other than touch screens (e.g., touchpads) have been devised for touch control operation. These touch control devices, however, are typically designed only for controlling the cursor on a screen and are intended mainly as a substitute for the existing cursor controllers such as external mice or trackballs. In contrast to touch screens, which can be used to give actuation instructions directly by a finger touch on the screens, the aforesaid touch control devices provide no such a function when touched by a user's finger. Hence, a touch control device capable of simulating the effect of a finger touch on a touch screen is desirable.

SUMMARY OF THE INVENTION

It is an object of the present invention to provide a touch control device and a control method thereof so that, when a touchpad is touched by an operating object, the corresponding coordinates of the operating object on a screen can be obtained by calculating with different sets of ratios depending on the touched position on the touchpad.

It is another object of the present invention to provide a touch control device and a control method thereof so that instruction windows can be opened according to the movement of an operating object.

Still another object of the present invention is to provide a touch control device and a control method thereof so that different instructions can be executed according to the touch control action of an operating object on a touchpad.

To achieve the above and other objects, the present invention provides a touch control device including an input element and a computation unit. The input element has a touchpad and a control unit. The touchpad includes a first area and a second area. The control unit is connected to the touchpad and is configured for detecting the coordinates of an operating object on the touchpad. The computation unit is connected to the control unit. If the touch by the operating object starts in the first area, the computation unit calculates the corresponding coordinates of the operating object on a screen according to the coordinates of the operating object on the touchpad and a first set of ratios. If the touch by the operating object starts in the second area, the computation unit calculates the corresponding coordinates of the operating object on the screen according to the coordinates of the operating object on the touchpad and a second set of ratios.

The present invention also provides a method for controlling a touch control device, and the method is carried out as follows. To begin with, a first area and a second area are defined on a touchpad. Then, it is determined whether a touch by an operating object starts in the first area or the second area. If the touch by the operating object starts in the first area, the corresponding coordinates of the operating object on a screen are calculated according to the coordinates of the operating object on the touchpad and a first set of ratios. If the touch by the operating object starts in the second area, the corresponding coordinates of the operating object on the screen are calculated according to the coordinates of the operating object on the touchpad and a second set of ratios.

The present invention also provides a touch control device including an input element and a computation unit. The input element has a touchpad and a control unit. The touchpad includes a first area and a second area, wherein the first area is a peripheral area of the touchpad. The control unit is connected to the touchpad and is configured for detecting the movement of an operating object on the touchpad. The computation unit is connected to the control unit. If the computation unit determines that the operating object has moved on the touchpad from the first area toward the second area, an instruction window is opened on a screen according to the movement of the operating object.

The present invention also provides a method for controlling a touch control device, and the method is carried out as follows. To begin with, a first area and a second area are defined on a touchpad, wherein the first area is a peripheral area of the touchpad. Then, the movement of an operating object on the touchpad is detected, and it is determined whether the operating object has moved on the touchpad from the first area toward the second area. If the operating object has moved on the touchpad from the first area toward the second area, an instruction window is opened on a screen according to the movement of the operating object.

The present invention also provides a method for controlling a touch control device, and the method includes determining the number of operating objects on a touchpad and determining the number of instruction items of an application program that is currently running. If the number of operating objects on the touchpad is greater than one and if the number of instruction items of the application program is greater than one, a virtual frame is defined on a screen. The corresponding coordinates of the operating objects in the virtual frame are calculated according to the coordinates of the operating objects on the touchpad and a set of ratios.

The present invention also provides a method for controlling a touch control device, and the method includes determining the number of operating objects on a touchpad. If there is only one operating object, it is then determined whether the operating object has double-clicked the touchpad. If the operating object has double-clicked the touchpad, a virtual touch control element is generated on a screen, and it is detected whether the operating object has displaced on the touchpad. If the operating object has displaced on the touchpad, a window page switching instruction is executed.

The present invention also provides a method for controlling a touch control device, and the method includes determining the number of operating objects on a touchpad. If there is only one operating object, it is then determined whether the operating object has performed a touch control action on the touchpad. If the operating object has performed a touch control action on the touchpad, a control window frame is defined on a screen, and the corresponding coordinates of the operating object in the control window frame are calculated according to the coordinates of the operating object on the touchpad and a set of ratios.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which:

FIG. 13 schematically shows how in the third embodiment of the present invention a graphical item is dragged on a screen by moving an operating object;

DETAILED DESCRIPTION OF THE INVENTION

The present invention mainly provides a touch control device for use with an operating system that supports touch control operation, such as Windows 7, Windows 8, and iPhone OS, so as to enable intuitive operation similar to what is achievable by touching a touch screen with a finger. The touch control device of the present invention can be a built-in or external touch control device. In the former case, the built-in touch control device is applicable to the touchpad of a laptop computer or a transformable tablet computer (e.g., the Transformer-series tablet computers of ASUSTeK Computer Inc.); in the latter case, the external touch control device can be designed as one connectable to a computer device via a wired or wireless transmission interface (e.g., USB, PS2, infrared, or Bluetooth), such as an external touchpad, a mouse with a touchpad, a controller with a touchpad, a keyboard with a touchpad, or a touch keyboard with a touchpad.

Figure 1:
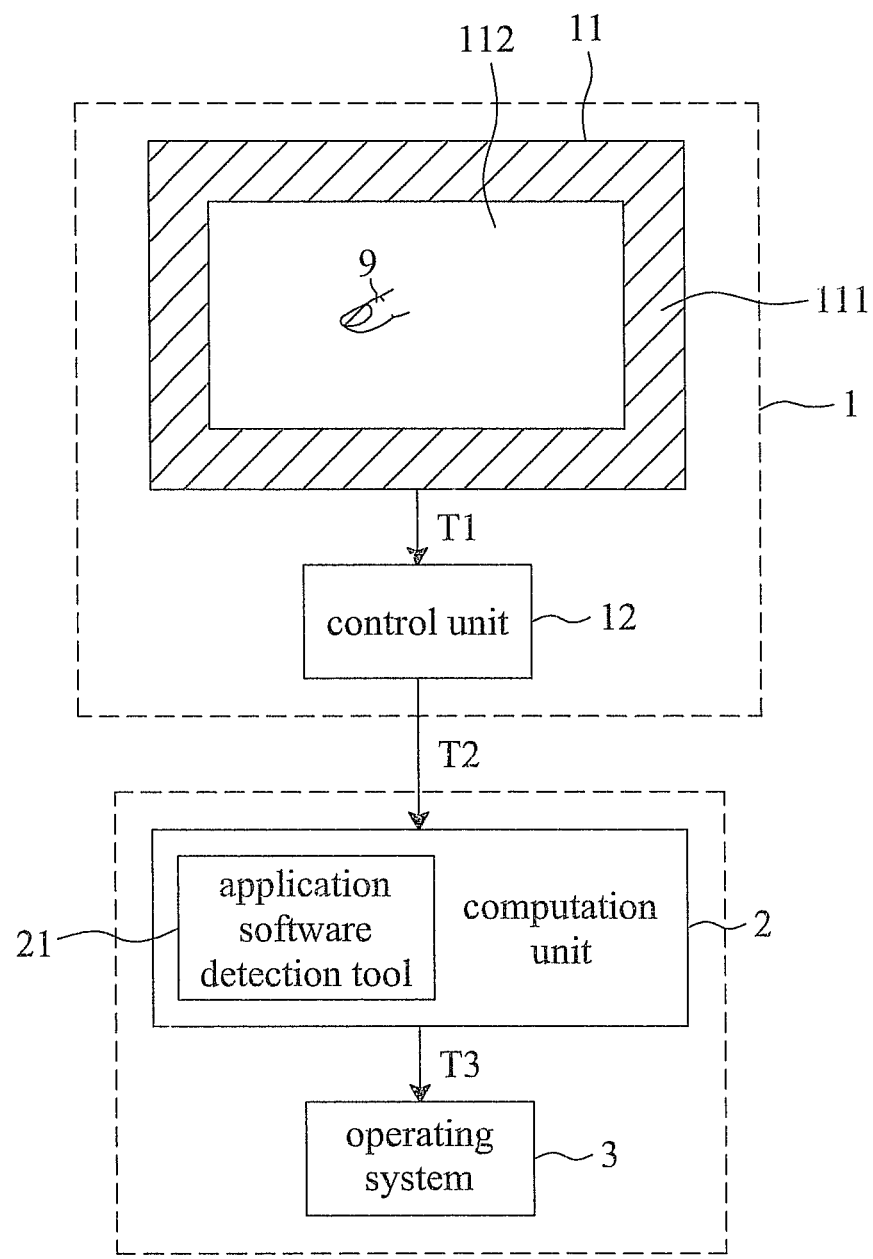
FIG. 1 is a system structure diagram of the touch control device in the first embodiment of the present invention.

FIG. 1 shows the touch control device in the first embodiment, wherein the touch control device includes an input element 1 and a computation unit 2. The input element 1 has a touchpad 11 and a control unit 12. The touchpad 11 is provided with a plurality of sensing elements (not shown) for detecting whether the touchpad 11 is in contact with an operating object 9. The sensing elements generate a detection signal T1 according to the position of the operating object 9. The touchpad 11 serves as a dynamic information input end of the input element 1 so that a user can give instructions and control a cursor by moving the operating object 9 on the touchpad 11. The touchpad 11 at least has one first area 111 and one second area 112 defined thereon. The first area 111 and the second area 112 can be defined anywhere on the touchpad 11 as needed. In FIG. 1, the first area 111 is defined in a peripheral area of the touchpad 11, and the second area 112 is defined in a central area of the touchpad 11 and surrounded by the first area 111. The control unit 12 is electrically connected to the sensing elements and the computation unit 2 and is configured for receiving the detection signal T1 and converting the detection signal T1 into information T2 related to the coordinates of the operating object 9 on the touchpad 11 (hereinafter referred to as the coordinate information T2). The computation unit 2 is installed under the operating system 3 of a computer device and is configured for converting the coordinate information T2 into information T3 related to the corresponding coordinates of the operating object 9 on a screen 4 (hereinafter referred to as the coordinate information T3) and delivering the coordinate information T3 to the operating system 3.

Figure 2:
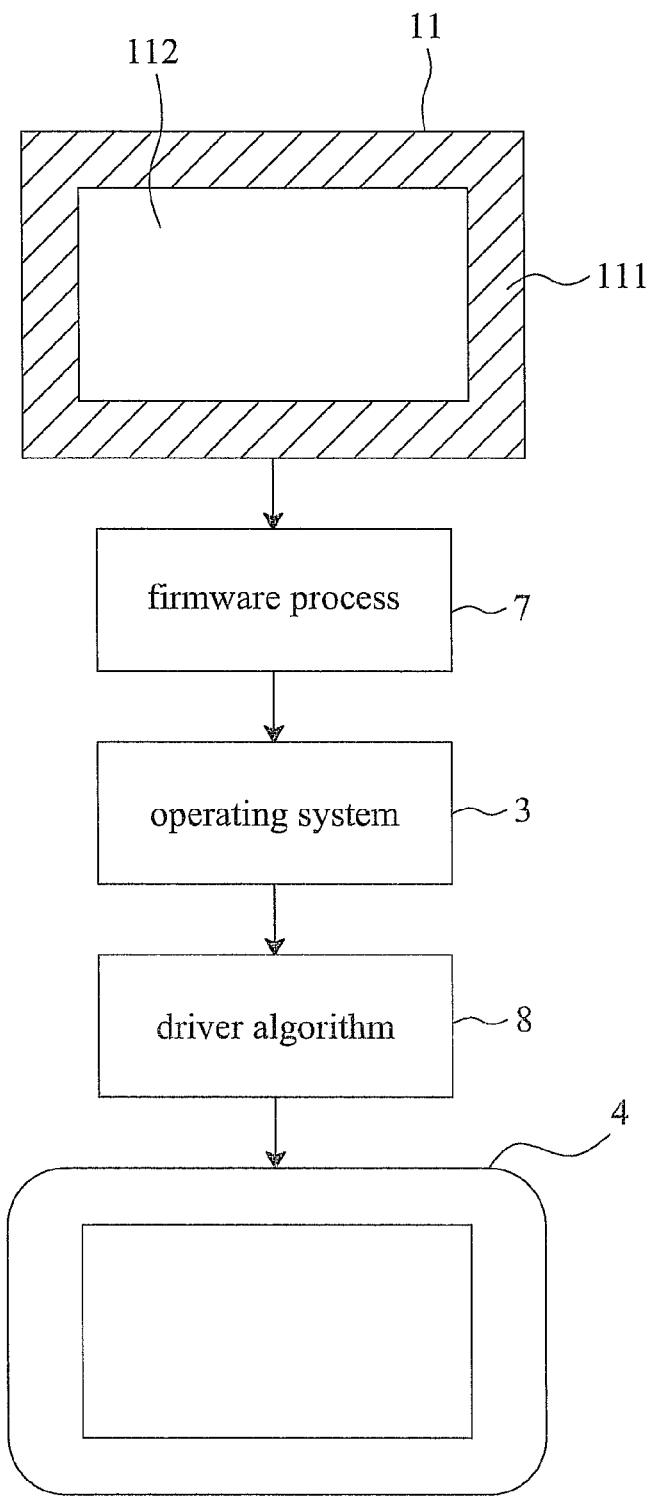
FIG. 2 is another system structure diagram of the touch control device in the first embodiment of the present invention.

FIG. 2 schematically shows the process flow of the aforesaid touch control device during use. The control unit 12 and the computation unit 2 are included in a firmware process 7 and are in charge of coordinate conversion, mode determination, and control. Upon completing the firmware process, the touch control device sends a message to the operating system 3 so that output information is transmitted to the screen 4 through a driver algorithm 8 in the operating system 3.

Figure 3:
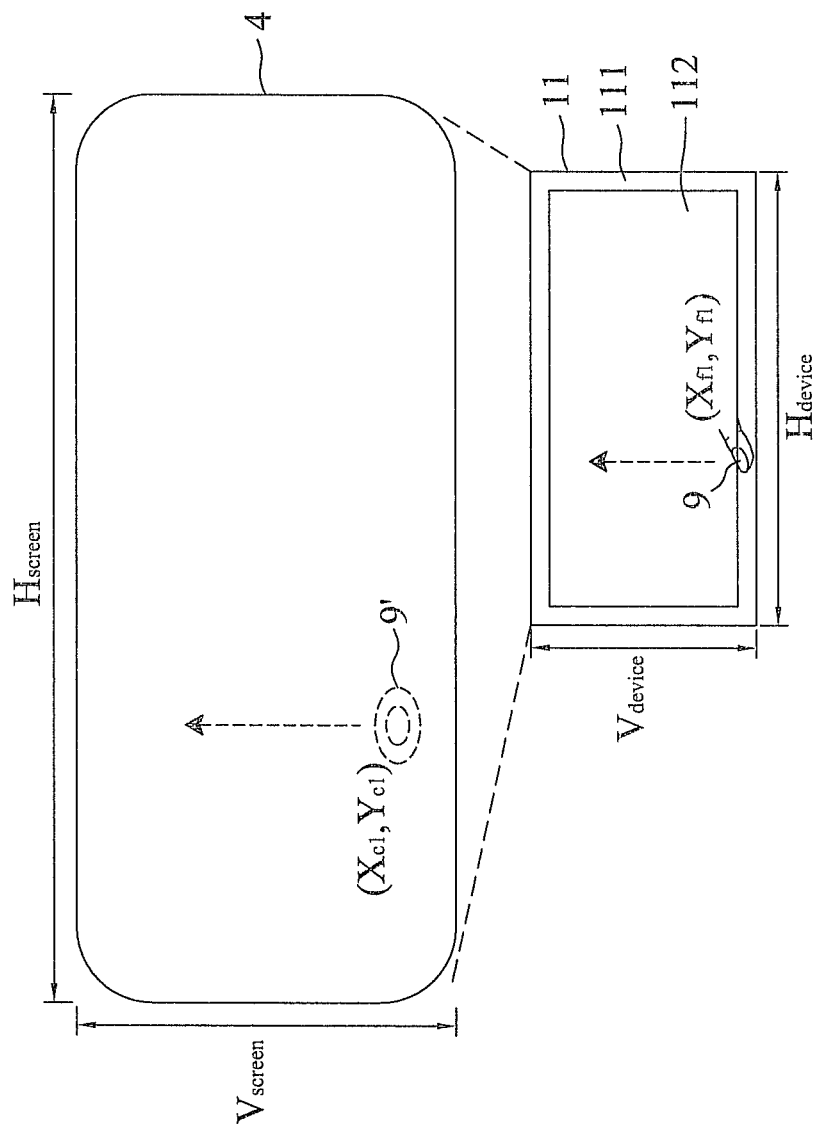
FIG. 3 schematically shows how in the first embodiment of the present invention the corresponding coordinate position of an operating object on a screen is calculated according to a width ratio and a height ratio between the screen and a touchpad.

FIG. 3 schematically shows how the corresponding coordinates of the operating object 9 on the screen 4 are calculated according to a width ratio and a height ratio between the screen 4 and the touchpad 11. If a user's finger (hereinafter referred to as the operating object 9) touches the touchpad 11 and the touch starts in the first area 111 of the touch pad 11, the control unit 12 sends the coordinate information T2 of the operating object 9 to the computation unit 2. Based on the coordinates (Xf1, Yf1) of the operating object 9 on the touchpad 11 and a first set of ratios, the computation unit 2 calculates the corresponding coordinates (Xc1, Yc1) of the operating object 9 on the screen 4 and generates a virtual touch control element 9' on the screen 4 accordingly, wherein the virtual touch control element 9' changes its coordinate position on the screen 4 in response to the movement of the operating object 9 on the touchpad 11. The user can exercise control or execute instructions via the position and displacement of the operating object 9 on the touchpad 11.

Figure 4:
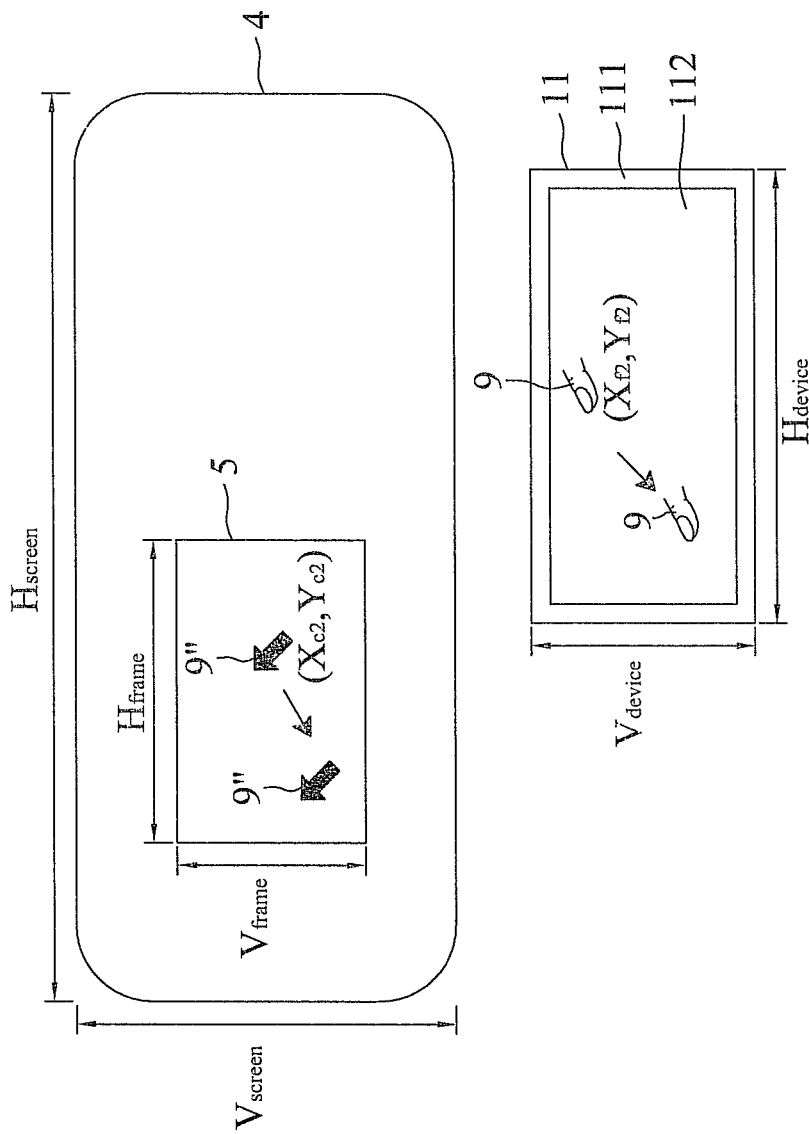
FIG. 4 schematically shows how in the first embodiment of the present invention the corresponding coordinate position of an operating object on a screen is calculated according to a width ratio and a height ratio between a control window frame and a touchpad.

FIG. 4 schematically shows how the corresponding coordinates of the operating object 9 on the screen 4 are calculated according to a width ratio and a height ratio between a control window frame 5 and the touchpad 11. If the touch on the touchpad 11 by the operating object 9 starts in the second area 112, the control unit 12 sends the coordinate information T2 of the operating object 9 to the computation unit 2. Based on the coordinates (Xf2, Yf2) of the operating object 9 on the touchpad 11 and a second set of ratios, the computation unit 2 calculates the corresponding coordinates (Xc2, Yc2) of the operating object 9 in the control window frame 5. In addition, the computation unit 2 uses the last position of a cursor 9" on the screen 4 as the reference coordinate position and defines the control window frame 5 on the screen 4 according to the reference coordinate position. Consequently, the coordinates (Xc2, Yc2) in the control window frame 5 correspond to the reference coordinate position, and the cursor 9'" is displayed at the coordinates (Xc2, Yc2) in the control window frame 5. By moving the operating object 9 on the touchpad 11, the user can change the coordinate position of the cursor 9" on the screen 4 and thus control the cursor 9'".

Figure 5:
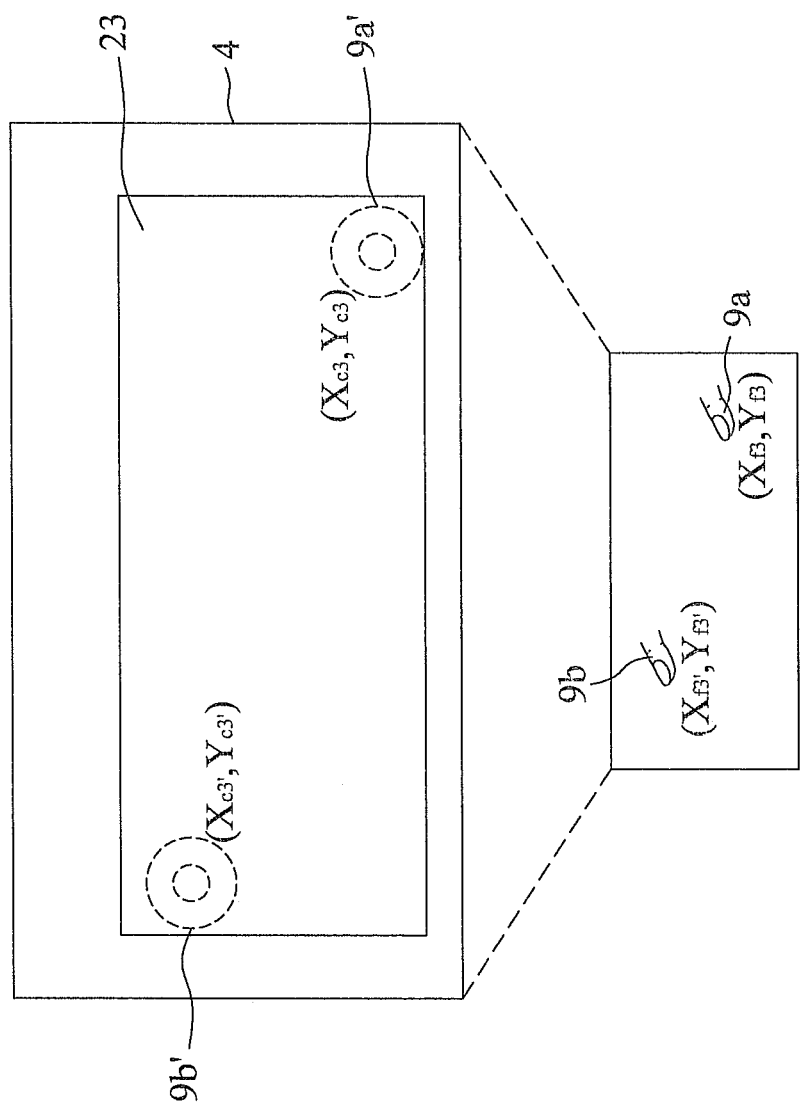
FIG. 5 schematically shows how in the first embodiment of the present invention a touchpad is proportionally mapped onto a screen according to the condition of multiple operating objects on the touchpad.
Figure 6:
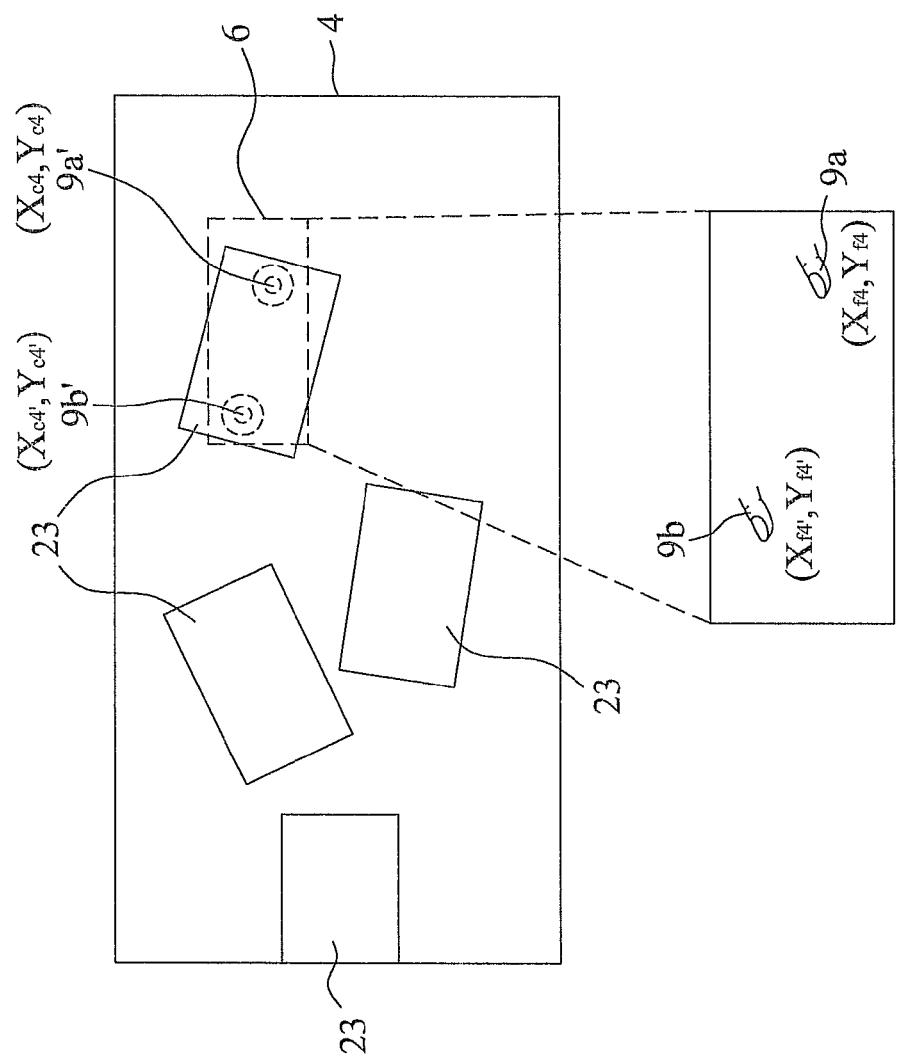
FIG. 6 schematically shows how in the first embodiment of the present invention a virtual frame corresponding to a touchpad is mapped onto a screen according to the condition of multiple operating objects on the touchpad.

The computation unit 2 in FIG. 1 further includes an application software detection tool 21 for determining the number of instruction items of an application software that is currently running. FIG. 5 schematically shows how the touchpad 11 is proportionally mapped onto the screen 4 according to the condition of multiple operating objects on the touchpad 11. When the touchpad 11 is touched by multiple operating objects 9a and 9b, the application software detection tool 21 of the computation unit 2 determines whether the number of instruction items 23 of the currently running application software is greater than one, wherein the instruction items 23 can be graphical items, folders, and so on. If there is only one instruction item 23, the computation unit 2 calculates the corresponding coordinates (Xc3, Yc3) and (Xc3', Yc3') of the operating objects 9a and 9b on the screen 4 according to the coordinates (Xf3, Yf3) and (Xf3', Yf3') of the operating objects 9a and 9b on the touchpad 11 and the first set of ratios and generates virtual touch control elements 9a' and 9b' on the screen 4 accordingly. Referring to FIG. 6, if there are plural instruction items 23, the computation unit 2 defines a virtual frame 6 on the screen 4, wherein the virtual frame 6 corresponds in position to one of the instruction items 23. Then, based on the coordinates (Xf4, Yf4) and (Xf4', Yf4') of the operating objects 9a and 9b on the touchpad 11 and a third set of ratios, the computation unit 2 calculates the corresponding coordinates (Xc4, Yc4) and (Xc4', Yc4') of the operating objects 9a and 9b in the virtual frame 6 and generates the virtual touch control elements 9a' and 9b' in the virtual frame 6 accordingly. Thus, the user can operate the instruction item 23 by finger actions on the touchpad 11.

Figure 7:
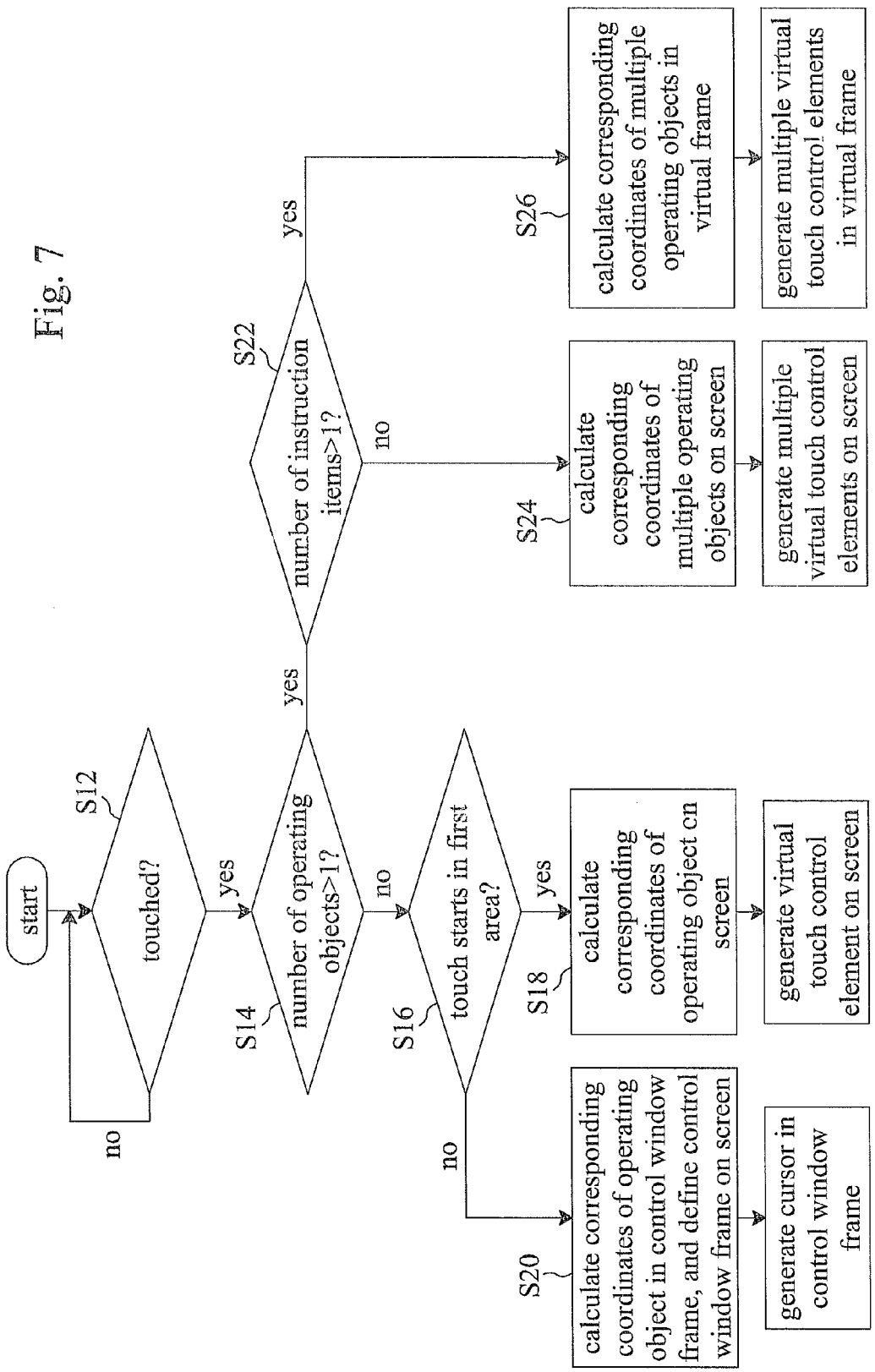
FIG. 7 is a flowchart of the control method in the first embodiment of the present invention.

FIG. 7 is a flowchart of the control method in the embodiment shown in FIGS. 3 to 6. In the first step S12, it is detected whether the touchpad 11 is touched by an operating object 9. If yes, the sensing elements generate the analog detection signal T1 according to the position of the operating object 9 on the touchpad 11. The control unit 12 converts the detection signal T1 into the coordinate information T2, which is related to the coordinates of the operating object 9 on the touchpad 11 and is sent by the control unit 12 to the computation unit 2. In step S14, the computation unit 2 determines according to the coordinate information T2 whether the number of the operating object(s) 9 is greater than one. If no, the computation unit 2 determines that there is only one operating object 9 on the touchpad 11, and the process goes on to step S16. In step S16, the computation unit 2 determines according to the coordinate information T2 whether the touch on the touchpad 11 by the operating object 9 starts in the first area 111 or the second area 112. If the touch by the operating object 9 starts in the first area 111, step S18 is executed. When necessary, the determination process in step S16 may be carried out by the control unit 12 instead, before step S18 is executed.

Referring to FIG. 7 in conjunction with FIG. 3, step S18 involves computation by the computation unit 2 according to the coordinates (Xf1, Yf1) of the operating object 9 on the touchpad 11 and the first set of ratios, wherein the first set of ratios are the width ratio $$\frac{H_{screen}}{H_{device}}$$

and the height ratio $$\frac{V_{screen}}{V_{device}}$$

between the screen 4 and the touchpad 11. The corresponding coordinates (Xc1, Yc1) of the operating object 9 on the screen 4 are calculated from the coordinates (Xf1, Yf1) of the operating object 9 on the touchpad 11 by the computation unit 2 as $$X_{c1} = \frac{H_{screen}}{H_{device}} \times X_{f1}, Y_{c1} = \frac{V_{screen}}{V_{device}} \times Y_{f1}. \quad [\text{Eq-1}]$$

Once the calculation of the above coordinate information T3 is completed, the computation unit 2 sends the coordinate information T3 to the operating system 3 and generates the virtual touch control element 9' on the screen 4 accordingly. The virtual touch control element 9' can be displayed on the screen 4 or hidden from view as needed. When the operating object 9 slides on the touchpad 11, the virtual touch control element 9' changes its coordinate position on the screen 4 in response to the movement of the operating object 9 (see FIG. 3). This allows the user to control instructions by touching the touchpad 11 with the operating object 9 and by moving the operating object 9 on the touchpad 11.

Referring to FIG. 7 in conjunction with FIG. 4, step S20 is executed if it is determined in step S16 that the touch by the operating object 9 starts in the second area 112. In step S20, the control window frame 5 is defined on the screen 4. The shape and area of the control window frame 5 can be the same as or be scaled up or down from those of the touchpad 11 respectively. More specifically, the computation unit 2 performs computation based on the coordinates (Xf2, Yf2) of the operating object 9 on the touchpad 11 and the second set of ratios. The width-height ratio of the control window frame 5 is defined in advance, and the second set of ratios are the width ratio and the height ratio $$\frac{V_{frame1}}{V_{device}}$$

between the control window frame 5 and the touchpad 11. The corresponding coordinates (Xc2, Yc2) of the operating object 9 in the control window frame 5 are calculated from the coordinates (Xf2, Yf2) of the operating object 9 on the touchpad 11 by the computation unit 2 as $$X_{c2} = \frac{H_{frame1}}{H_{device}} \times X_{f2}, \quad Y_{c2} = \frac{V_{frame1}}{V_{device}} \times Y_{f2}. \quad [\text{Eq-2}]$$

Upon completing the calculation of the foregoing coordinate information T3, the computation unit 2 transmits the coordinate information T3 to the operating system 3 and, using the last position of the virtual touch control element 9' or the cursor 9" on the screen 4 as the reference coordinate position, maps the coordinates (Xc2, Yc2) in the control window frame 5 to the reference coordinate position, thereby defining the position of the control window frame 5 on the screen 4. As a result, the cursor 9" is displayed at the coordinates (Xc2, Yc2) in the control window frame 5.

The user can change the coordinate position of the cursor 9" by moving the operating object 9. In addition, the control window frame 5 can be displayed on the screen 4 or hidden from view as desired. Displaying the control window frame 5 on the screen 4 allows the user to know the current position of the control window frame 5; however, as the user need not know the position of the control window frame 5 during operation, the user may choose to hide the control window frame 5 or display it in a flashing manner.

Referring to FIG. 7 in conjunction with FIG. 5, step S22 is carried out if it is determined in step S14 that there are multiple operating objects 9a and 9b on the touchpad 11. In step S22, the application software detection tool 21 determines the number of instruction items 23 of the currently running application software. The instruction items 23 in this embodiment are the graphical items shown in FIGS. 5 and 6. If there is only one instruction item 23, the process moves on to step S24. In step S24, the computation unit 2 calculates the corresponding coordinates (Xc3, Yc3) and (Xc3', Yc3') of the operating objects 9a and 9b on the screen 4 according to the coordinates (Xf3, Yf3) and (Xf3', Yf3') of the operating objects 9a and 9b on the touchpad 11 and the first set of ratios (see Eq-1). Thus, the virtual touch control elements 9a' and 9b' are generated on the screen 4, allowing the user to operate the single instruction item 23 of the application software intuitively via the multiple operating objects on the touchpad 11.

Referring to FIG. 7 in conjunction with FIG. 6, step S26 is executed if it is determined in step S22 that there are multiple instruction items 23. In step S26, the virtual frame 6 is defined on the screen 4, using the positions of the virtual touch control elements 9a' and 9b' on the screen 4 as the reference points. More particularly, the center point or one of the end points of the virtual frame 6 is mapped to the reference point such that the virtual frame 6 corresponds in position to one of the instruction items 23 of the application program. Preferably, the shape and area of the virtual frame 6 are the same as those of the touchpad 11 respectively, or the area of the virtual frame 6 is scaled up or down from the area of the touchpad 11 according to the area of the instruction item 23. Following that, the computation unit 2 performs computation based on the coordinates (Xf4, Yf4) and (Xf4', Yf4') of the operating objects 9a and 9b on the touchpad 11 and the third set of ratios, wherein the third set of ratios are the width ratio $$\frac{H_{frame2}}{H_{device}}$$

and the height ratio $$\frac{V_{frame2}}{V_{device}}$$

between the virtual frame 6 and the touchpad 11. The corresponding coordinates (Xc4, Yc4) of the operating object 9a in the virtual frame 6 are calculated from the coordinates (Xf4, Yf4) of the operating object 9a on the touchpad 11 by the computation unit 2 as $$X_{c4} = \frac{H_{frame2}}{H_{device}} \times X_{f4}, \quad Y_{c4} = \frac{V_{frame2}}{V_{device}} \times Y_{f4}. \quad [\text{Eq-3}]$$

A similar calculation is performed for the operating object 9b. Upon completing the calculation of the above coordinate information T3, the computation unit 2 sends the coordinate information T3 to the operating system 3. Accordingly, the virtual touch control elements 9a' and 9b' are generated in the virtual frame 6, allowing the user to operate the one instruction item 23 of the application program intuitively by means of the multiple operating objects on the touchpad 11.

Moreover, the virtual frame 6 can be displayed on the screen 4 or hidden from view as needed. Displaying the virtual frame 6 on the screen 4 allows the user to know the current position of the virtual frame 6, and yet it is not necessary for the user to know such information during operation. Hence, the user may choose to hide the virtual frame 6 or display it in a flashing manner.

In addition, if the operating object 9 leaves the touchpad 11 upon completion of step S18, S20, S24, or S26, the process returns to step S12 to detect whether the touchpad 11 is touched by an operating object 9.

Figure 8:
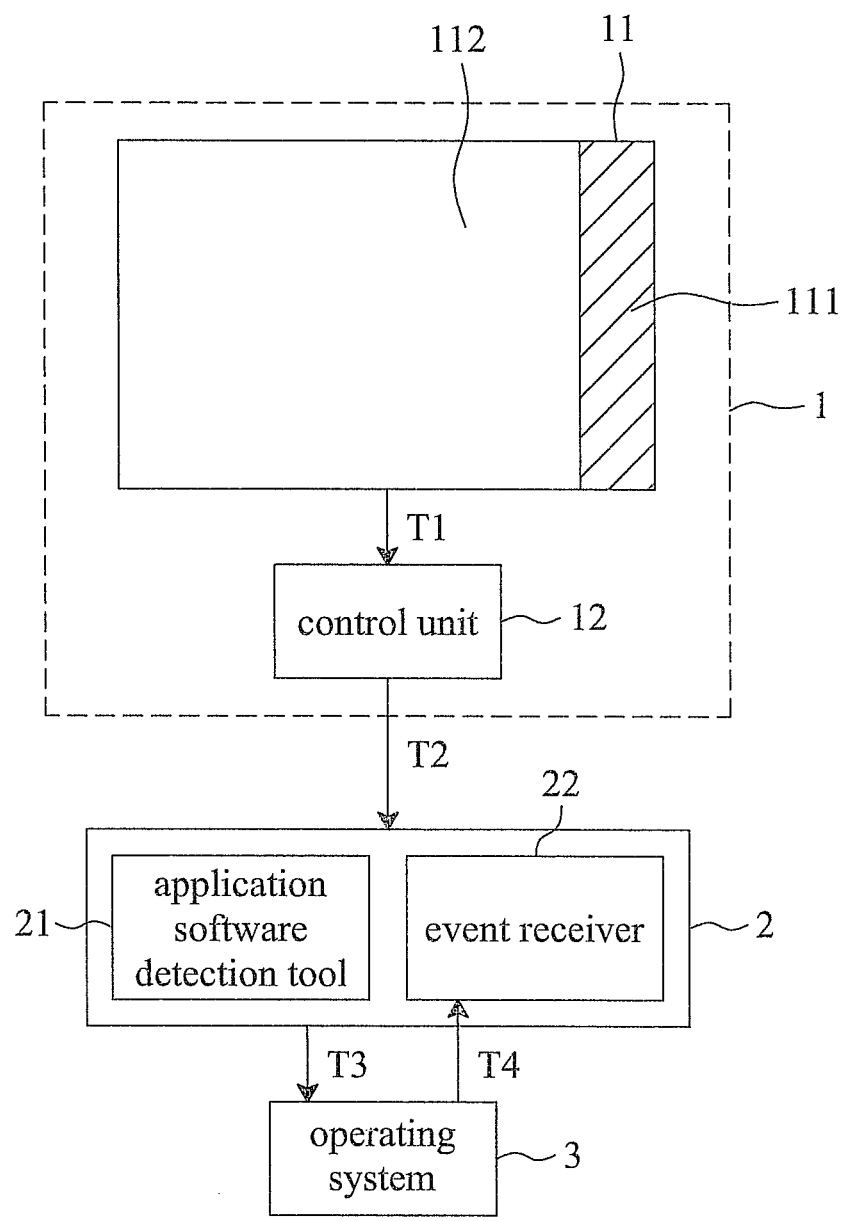
FIG. 8 is a system structure diagram of the touch control device in the second embodiment of the present invention.
Figure 9:
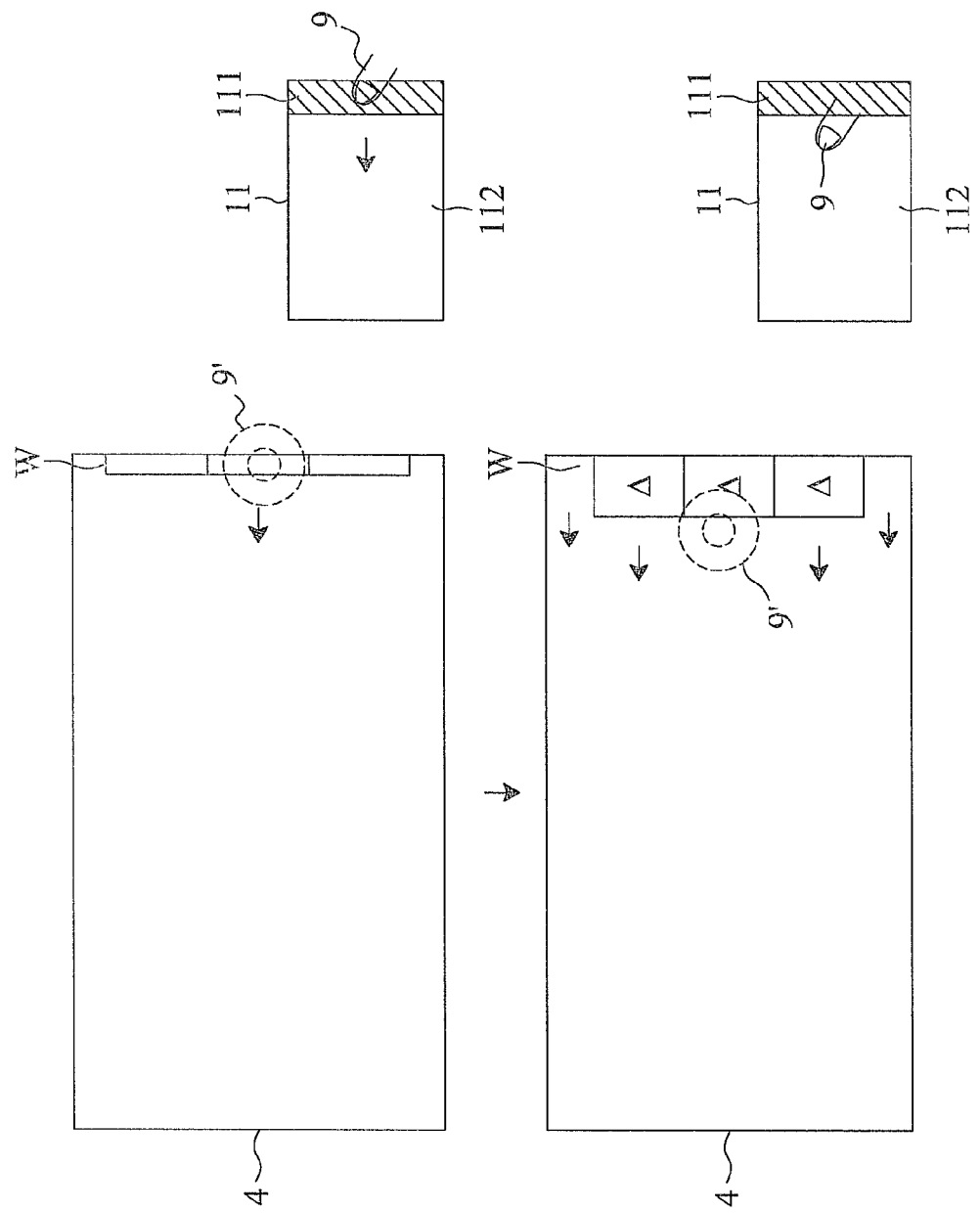
FIG. 9 schematically shows how in the second embodiment of the present invention an instruction window is opened on a screen by moving an operating object.
Figure 10:
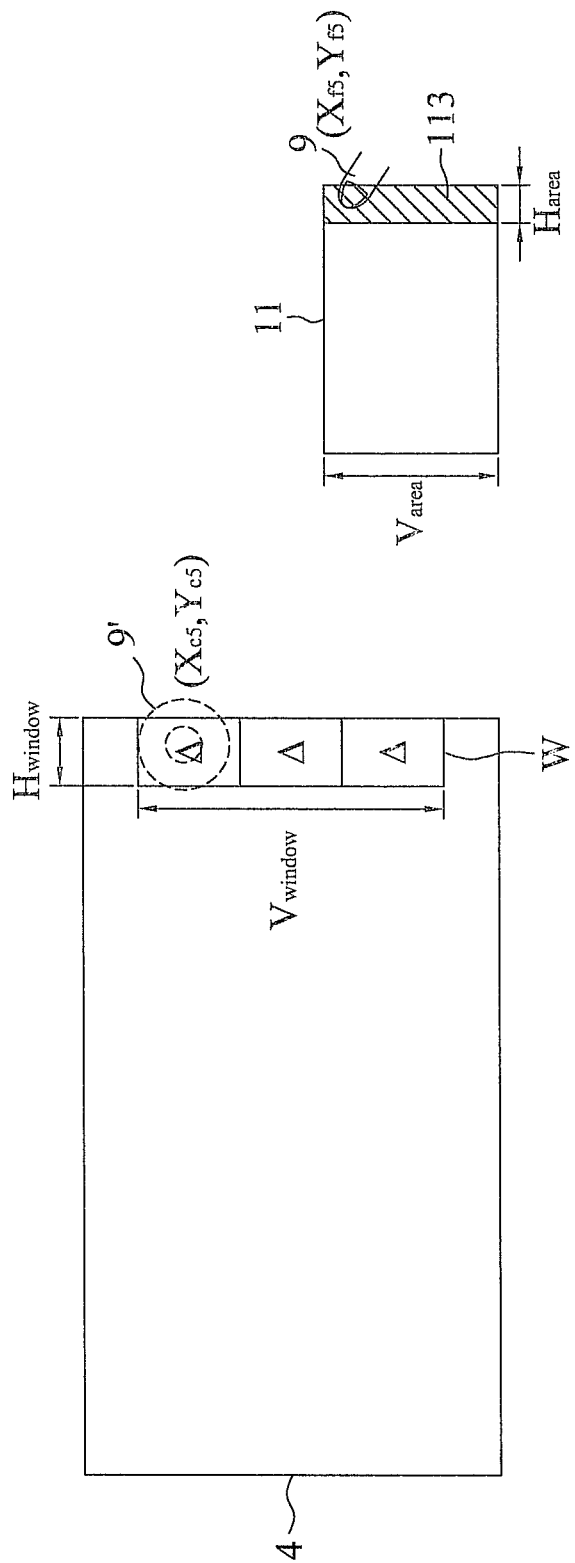
FIG. 10 schematically shows how in the second embodiment of the present invention an operating object operates an instruction window through a virtual instruction area.

Referring to FIGS. 8 to 10, the touch control device in the second embodiment of the present invention has substantially the same construction as its counterpart in the first embodiment except that the first area 111 of the touchpad 11 corresponds to an instruction window W (e.g., a toolbar in the Windows system) at the right edge of the screen 4 and is defined at the right edge of the touchpad 11. The instruction window W can disappear into the right edge of the screen 4. Besides, the touchpad 11 defines a virtual instruction area 113. Preferably, the virtual instruction area 113 is defined in an area of the touchpad 11 that corresponds in position to the instruction window W, and at least two borders of the virtual instruction area 113 coincide with borders of the touchpad 11 respectively. In this embodiment, the first area 111 coincides with the virtual instruction area 113 in range. Furthermore, the computation unit 2 includes an event receiver 22 for receiving an event signal T4 from the operating system 3.

FIG. 9 schematically shows how the instruction window W is opened by moving an operating object. When the touchpad 11 is touched by the user's finger (hereinafter referred to as the operating object 9) in such a way that the touch starts in the first area 111 of the touchpad 11 and the operating object 9 moves from the first area 111 toward the second area 112, the virtual touch control element 9' drags the instruction window W, which has disappeared into the right edge of the screen 4, toward the center of the screen 4 in response to the movement of the operating object 9. Consequently, the instruction window W is opened and displayed on the screen 4. The touchpad 11 at this moment defines the virtual instruction area 113 (see FIG. 10) according to the position of the instruction window W, so as for the user to operate the instruction window W intuitively through the virtual instruction area 113.

Figure 11:
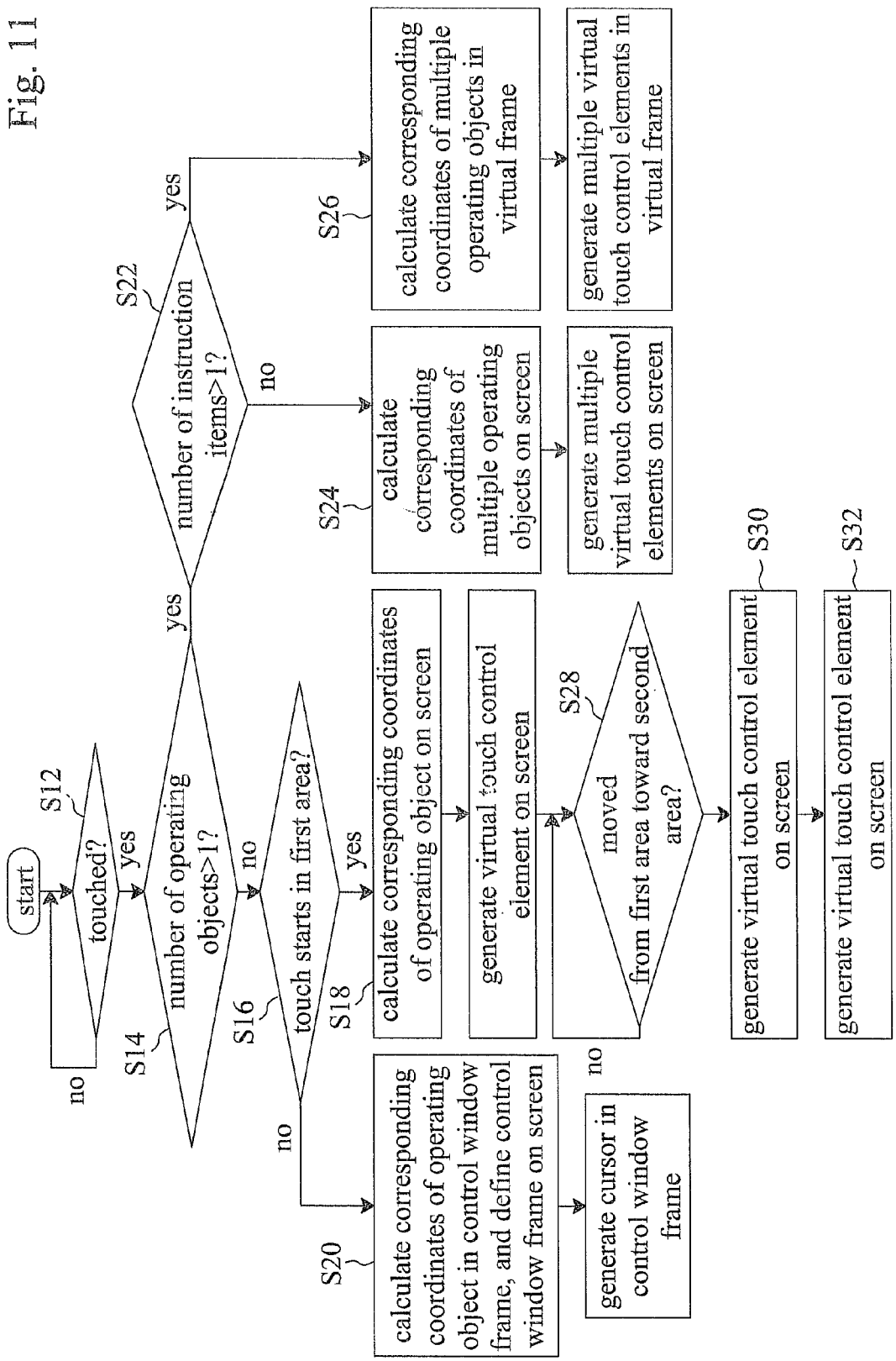
FIG. 11 is a flowchart of the control method in the second embodiment of the present invention.

FIG. 11 is a flowchart of the control method in the embodiment shown in FIGS. 9 and 10. Steps S12, S14, S16, and S18 in FIG. 11 are the same as those in the previous embodiment and involve determining whether the touch by the operating object 9 starts in the first area 111 and generating the virtual touch control element 9' on the screen 4. Then, in step S28, the computation unit 2 determines whether the operating object 9 has moved from the first area 111 toward the second area 112; if yes, step S30 is performed. In addition, upon completing the determination process of step S28, the first area 111 and the second area 112 defined on the touchpad 11 are temporarily canceled to facilitate the execution of subsequent steps. In step S30, the instruction window W is opened according to the movement of the operating object 9. Meanwhile, the operating system 3 generates the event signal T4 according to the event instruction being executed and sends the event signal T4 to the event receiver 22. In the following step S32, the computation unit 2 defines the virtual instruction area 113 on the touchpad 11 according to the event signal T4 and performs computation based on the coordinates (Xf5, Yf5) of the operating object 9 on the touchpad 11 and a fourth set of ratios, wherein the fourth set of ratios are the width ratio $$\frac{H_{window}}{H_{area}}$$

and the height ratio $$\frac{V_{window}}{V_{area}}$$

between the instruction window W and the virtual instruction area 113. The corresponding coordinates (Xc5, Yc5) of the operating object 9 in instruction window W are calculated from the coordinates (Xf5, Yf5) of the operating object 9 in the virtual instruction area 113 by the computation unit 2 as $$X_{c5} = \frac{H_{window}}{H_{area}} \times X_{f5}, Y_{c5} = \frac{V_{window}}{V_{area}} \times Y_{f5}. \quad [\text{Eq-4}]$$

After the calculation of the foregoing coordinate information T3 is completed, the computation unit 2 sends the coordinate information T3 to the operating system 3. Hence, by operating the operating object 9 in the virtual instruction area 113, the user can execute instructions in the instruction window W or perform other actions.

In a different aspect, once the instruction window W is opened in step S30, the user's finger may leave the touchpad 11 and then touch the second area 112 of the touchpad 11. In that case, the computation unit 2 will cancel the virtual instruction area 113 on the touchpad 11 and generates the cursor 9" on the screen 4 through the foregoing steps S12, S14, S16, and S20. The user may move the cursor 9" to the instruction window W and click any instruction key in the instruction window W to execute the desired instruction or application program.

Figure 12:
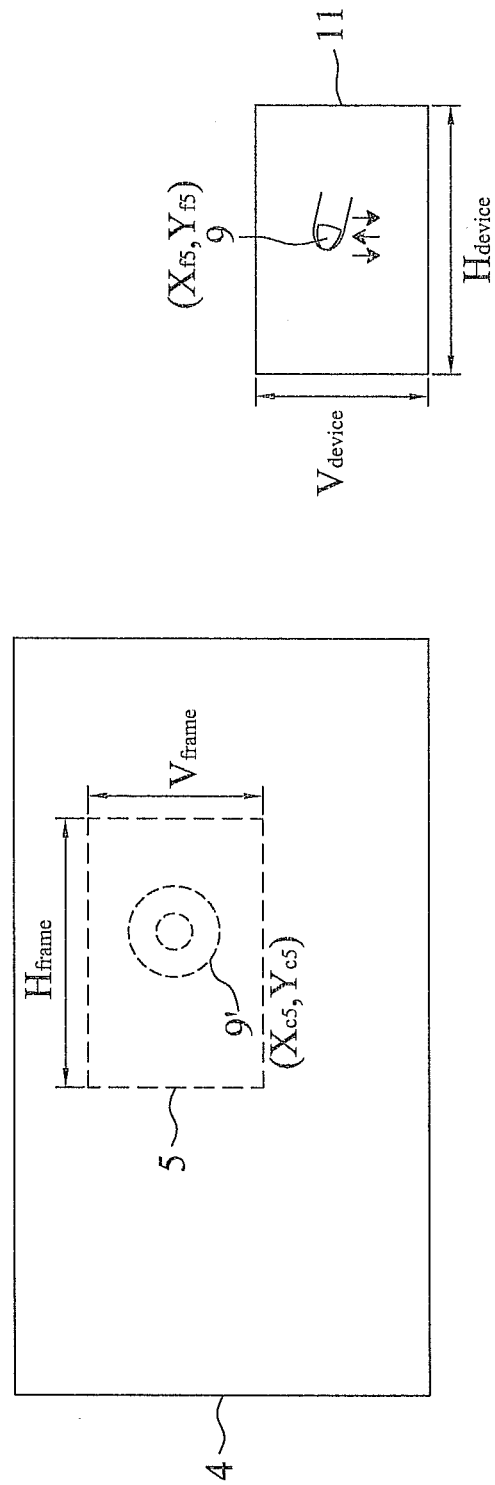
FIG. 12 schematically shows how in the third embodiment of the present invention the corresponding coordinates of an operating object on a screen are calculated according to a width ratio and a height ratio between a control window frame and a touchpad.

FIGS. 12 and 13 illustrate the control method in the third embodiment of the present invention. As the coordinate information T2 generated by the control unit 12 contains the position and time information of each touched point on the touchpad 11 that is touched by the operating object 9, the coordinate information T2 can be used to determine the various actions of the operating object 9 on the touchpad 11. In this embodiment, the touch control actions include double-clicking the touchpad 11. By "double-clicking", it is meant that the operating object 9 touches the touchpad 11, leaves the touchpad 11 within a first predetermined time Ta, and touches the touchpad 11 again within a second predetermined time Tb, wherein the distance Δd between the two touched points is less than a threshold value D. When it is determined that the touch control action performed by the operating object 9 is double-clicking the touchpad 11, the computation unit 2 calculates the corresponding coordinates (Xc5, Yc5) of the operating object 9 in the control window frame 5 according to the coordinates (Xf5, Yf5) of the operating object 9 on the touchpad 11 and the second set of ratios. Also, using the last position of the previous cursor 9" on the screen 4 as the reference coordinate position, the computation unit 2 defines the control window frame 5 on the screen 4 so as to generate the virtual touch control element 9' in the control window frame 5 accordingly. After double-clicking, the operating object 9 can be moved on the touchpad 11 so that the virtual touch control element 9' generated by double-clicking drags an instruction item 23 on the screen 4 (see FIG. 13), switches window pages, or executes other instructions.

Figure 14:
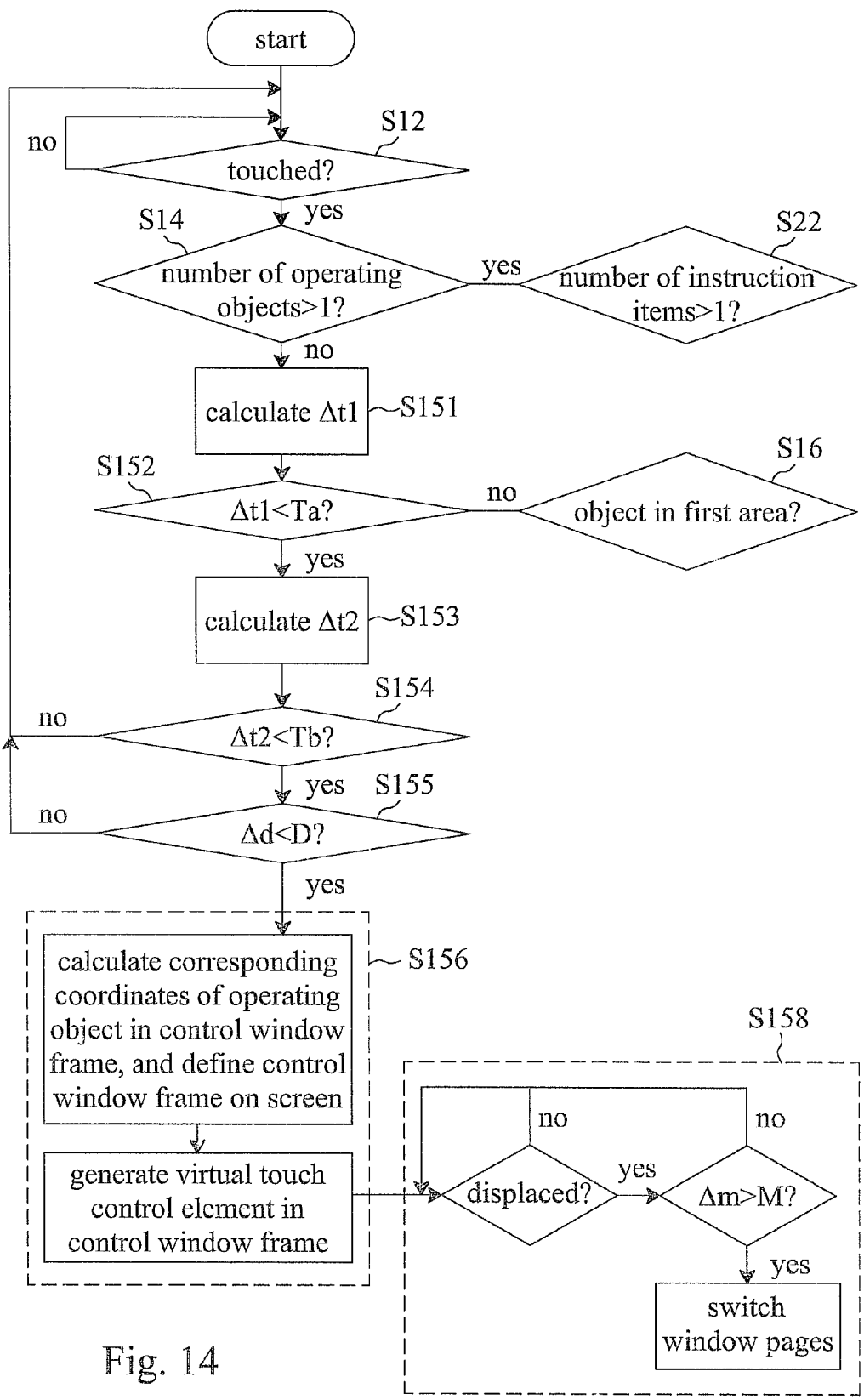
FIG. 14 is a flowchart of the control method in the third embodiment of the present invention.

FIG. 14 is a flowchart of the control method in the embodiment shown in FIGS. 12 and 13. To begin with, it is detected in step S12 whether the touchpad 11 is touched by an operating object 9. If yes, it is determined in step S14 whether the number of the operating object 9 is greater than one. If there is only one operating object 9, step S151 is performed in which the time Δt1 for which the operating object 9 touches the touchpad 11 is counted. It is also determined whether the operating object 9 has left the touchpad 11. In step S152, it is determined by comparison whether Δt1 is less than the first predetermined time Ta. If Δt1 is less than the first predetermined time Ta, the time Δt2 for which the operating object 9 has left the touchpad 11 is counted in step S153. It is also determined whether the operating object 9 has touched the touchpad 11 again. If the operating object 9 has touched the touchpad 11 again, it is determined in step S154 by comparison whether Δt2 is less than the second predetermined time Tb. If Δt2 is less than the second predetermined time Tb, it is determined in step S155 whether the distance Δd between the aforesaid two touched points is less than the threshold value D. If Δd<D, it is determined that the touch control action performed by the operating object 9 is double-clicking, and the process goes on to step S156.

In step S156, the computation unit 2 calculates the corresponding coordinates (Xc5, Yc5) of the operating object 9 in the control window frame 5 according to the second set of ratios as well as the coordinates (Xf5, Yf5) of the operating object 9 that correspond to the operating object 9's second touch on the touchpad 11. The second set of ratios have been described in the previous embodiments and therefore are not repeated here. Upon completing the calculation of the foregoing coordinate information T3, the computation unit 2 sends the coordinate information T3 to the operating system 3 and, using as the reference coordinate position the position of the virtual touch control element 9' or cursor 9''' last appearing on the screen 4, maps the coordinates (Xc5, Yc5) in the control window frame 5 onto the reference coordinate position, thereby defining the position of the control window frame 5 on the screen 4. Then, the virtual touch control element 9' is generated at the coordinates (Xc5, Yc5) in the control window frame 5.

After the virtual touch control element 9' is generated, it is detected in step S158 whether the operating object 9 has displaced on the touchpad 11. If the operating object 9 has displaced on the touchpad 11, it is also determined whether the displacement Δm of the operating object 9 is greater than a preset value M. If Δm>M, the virtual touch control element 9' executes the instruction of window page switching according to the displacement direction of the operating object 9.

What is claimed is:

1. A touch control device, comprising:
   an input element comprising a touchpad and a control unit, the touchpad having a first area and a second area defined thereon, the control unit being connected to the touchpad and configured for detecting a position on the touchpad that is touched by an operating object, so as for the control unit to obtain first coordinates, wherein the first area is defined in a peripheral area of the touchpad and the second area is defined in a central area of the touchpad; and
   a computation unit connected to the control unit, wherein if the touch by the operating object starts in the first area, the computation unit calculates, according to the first coordinates and a first set of ratios, corresponding coordinates of the operating object on a screen; and if the touch by the operating object starts in the second area, the computation unit calculates the corresponding coordinates of the operating object on the screen according to the first coordinates and a second set of ratios, wherein the second set of ratios is different from the first set of ratios.

2. The touch control device of claim 1, wherein the touchpad generates a detection signal in response to the touch by the operating object and sends the detection signal to the control unit, and the control unit generates the first coordinates according to the detection signal.

3. The touch control device of claim 2, wherein the control unit determines according to the detection signal whether the touch on the touchpad by the operating object starts in the first area or the second area.

4. The touch control device of claim 1, wherein the computation unit determines according to the first coordinates whether the touch on the touchpad by the operating object starts in the first area or the second area.

5. The touch control device of claim 1, wherein the second area is surrounded by the first area.

6. The touch control device of claim 1, wherein the first set of ratios are a width ratio and a height ratio between the screen and the touchpad.

7. The touch control device of claim 1, wherein the second set of ratios are a width ratio and a height ratio between a control window frame on the screen and the touchpad.

8. The touch control device of claim 1, wherein the computation unit has a software detection tool for detecting the number of instruction items of a currently running application software.

9. A method for controlling a touch control device including a touchpad having a first area and a second area, wherein the first area is defined in a peripheral area of the touchpad and the second area is defined in a central area of the touchpad, the method comprising steps of:
   A.) detecting a position on the touchpad that is touched by an operating object, so as to obtain first coordinates;
   B.) determining whether the touch by the operating object starts in the first area or the second area;
   C.) calculating, according to the first coordinates and a first set of ratios, corresponding coordinates of the operating object on a screen, if the touch by the operating object starts in the first area; and
   D.) calculating the corresponding coordinates of the operating object on the screen according to the first coordinates and a second set of ratios, if the touch by the operating object starts in the second area, wherein the second set of ratios is different from the first set of ratios.

10. The method of claim 9, wherein the step A comprises steps of:
    generating a detection signal in response to the touch on the touchpad by the operating object; and
    generating the first coordinates according to the detection signal.

11. The method of claim 10, wherein the step B comprises a step of determining according to the detection signal whether the touch by the operating object starts in the first area or the second area.

12. The method of claim 10, wherein the step B comprises a step of determining according to the first coordinates whether the touch by the operating object starts in the first area or the second area.

13. The method of claim 9, wherein the first set of ratios are a width ratio and a height ratio between the screen and the touchpad.

14. The method of claim 9, wherein the step D comprises a step of defining a control window frame on the screen, and the second set of ratios are a width ratio and a height ratio between the control window frame and the touchpad.

15. The method of claim 14, wherein the control window frame is equal to or proportional to the touchpad in shape and area.

16. The method of claim 9, wherein the second area is surrounded by the first area.

17. A method for controlling a touch control device, comprising steps of:
    A.) determining the number of operating objects on a touchpad;
    B.) determining the number of instruction items of a currently running application program; and
    C.) if there are plural said operating objects on the touchpad and if there are plural said instruction items, defining a virtual frame on a screen and calculating, according to coordinates of the operating objects on the touchpad and a third set of ratios, corresponding coordinates of the operating objects in the virtual frame.

18. The method of claim 17, wherein the third set of ratios are a width ratio and a height ratio between the virtual frame and the touchpad.

19. The method of claim 17, further comprising a step of calculating corresponding second coordinates of the operating objects on the screen according to first coordinates of the operating objects on the touchpad and a first set of ratios if there are plural said operating objects on the touchpad and if there is one and only one said instruction item.

20. The method of claim 19, wherein the first set of ratios are a width ratio and a height ratio between the screen and the touchpad.

21. The method of claim 17, wherein the step C comprises a step of using a reference point as a center point of the virtual frame or as one of end points of the virtual frame so as to define a position of the virtual frame, wherein the reference point is a cursor on the screen.

22. The method of claim 17, wherein the virtual frame is equal to the touchpad in shape and area.

23. The method of claim 17, wherein the virtual frame is proportional in area to the touchpad and corresponds in area to a said instruction item.

24. The method of claim 17, wherein the virtual frame can be directly displayed or not displayed on the screen.

\* \* \* \* \*